Feb. 7, 1967   T. J. KELLY   3,302,287
GRAPE-VINE CUTTER
Filed March 15, 1965
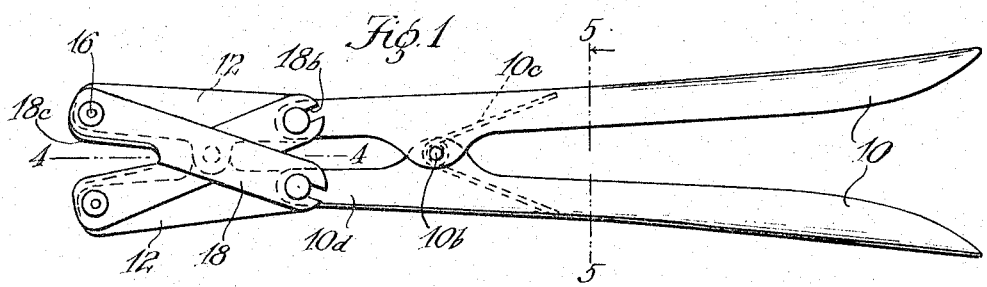
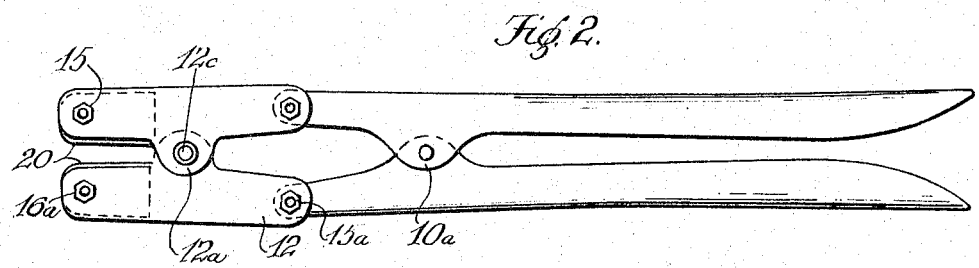
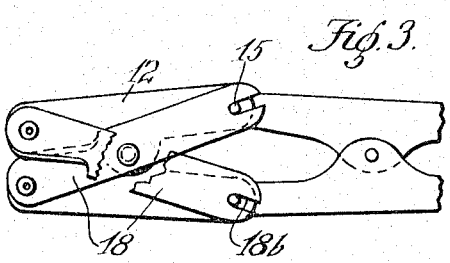
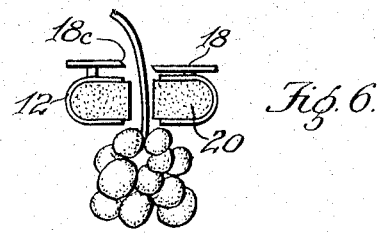
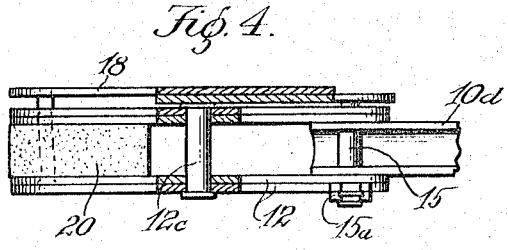
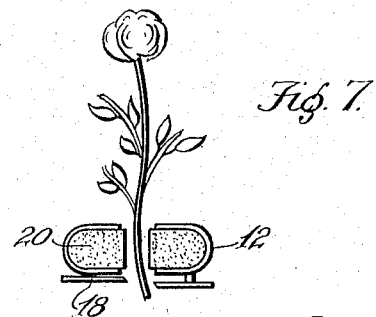
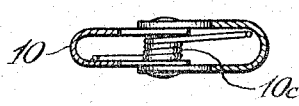
Inventor
Thos. J. Kelly
By Eugene E. Stevens
Raymond H. Stevens
Attorney

United States Patent Office 3,302,287
Patented Feb. 7, 1967

3,302,287
GRAPE-VINE CUTTER
Thomas J. Kelly, P.O. Box 26, International
Falls, Minn. 56649
Filed Mar. 15, 1965, Ser. No. 439,629
8 Claims. (Cl. 30—134)

My invention relates to implements for cutting grape-vines, stems of flowers, and stalks of noxious plants in gardens and orchards. Usually, a vine is held with one hand while a knife is applied with the other to cut the vine. In the case of grape-vines the hand for holding the vine is applied just above each bunch of grapes, and the knife above the hand; and in the case of flowers, the stem is held with one hand, while the knife is applied underneath the same. In either case, both hands are occupied and exposed to spiders or other crawling insects among the plants, or to stinging by thorns or injury by sharp edges or noxious weeds among the plants.

In view of the above situation, it is one object of the present invention to provide an implement for the above purpose which requires the use of only one hand both for holding the vine and severing the same.

A further object is to design the implement with holding and cutting means projected at a considerable length from the handle, whereby to locate the hand holding the implement sufficiently far back to avoid exposure to undesirable or injurious conditions among the plants where the cutting is being done.

Another object is to design a novel implement with elements which first grip the vine to hold it steady, and blades which cut the vine while it is held by gripping elements.

An additional object is to design the implement compactly and with blades which are removable for sharpening or replacement.

An important object is to combine the operative elements of the implement with a set of hand-grips in a manner to gain a favorable leverage when the implement is used.

A better understanding of the invention may be had by reference to the accompanying drawing, in which—

FIG. 1 is a top plan view of the implement with the blades open;

FIG. 2 is a bottom plan view of the implement when operated to close the blades;

FIG. 3 is a top plan view of the forepart of the implement, with the blades closed and one blade broken away in a medial zone;

FIGS. 4 and 5 are enlarged and ordinary sections on the lines 4—4 and 5—5 of FIG. 1, respectively;

FIG. 6 is a front end view of the implement as applied to a grape-vine; and

FIG. 7 is a similar end view of the implement as applied to a flower stem.

The general make-up of the present vine cutter involves three units, namely, the hand-grips 10, the jaws and the cutting blades. Specific reference to the drawing shows the hand-grips 10 as a pair of handles pressed or stamped into U-form, as the cross-section in FIG. 5 indicates. Since the hand-grips 10 are properly pressed or stamped from sheet steel, they are approximately of the same size, the difference in size apparent in FIG. 5 being only for clearer illustration. The sides of the hand-grips 10 are extended with crossed ears 10a which pivot on a cross-pin 10b; and FIGS. 1 and 5 shows that a V-type of torsion spring 10c is coiled on the cross-pin 10b to keep the hand-grips apart when the implement is not in use.

FIG. 2 indicates—by means of dotted lines—that the hand-grips 10 terminate a short distance forwardly of their pivoting (10c) zone with portions 10d entering a pair of jaws 12. These are of a cross-section similar to the hand-grips 10, and also have crossed ears 12a to pivot the jaws at a medial point on a cross-pin 12c. The rear end portions of the jaws 12 are joined pivotally to the forward end-portions 10d of the hand-grips on rear cross-bolts 15 entering from one side to receive securing nuts 15a on the other side, as seen by a comparison of FIGS. 1 and 2. Thus, with the hand-grips 10 spread as in FIG. 1, the jaws 12 extend in divergent relation; and when the hand-grips 10 are gathered as in FIG. 2, the forward ends of the jaws also assume a gathered relation.

A pair of forward cross-bolts 16 extend from one side through the forward end-portions of the jaws 12 to receive securing nuts 16a on the other side. The cross-bolts 16 pass freely through the front end-portions 18a of a pair of blades 18 before entering the jaws 12. The blades 18 cross each other—see FIG. 1—before they reach a position alongside the rear portions of the jaws 12, where the corresponding ends of the blades 18 are slotted as indicated at 18b to mount the rear cross-bolts 15 between the heads thereof and the adjacent sides of the jaws 12.

Applied as just described, the blades 18 become pivoted on the rear cross-bolts 15. The blades 18 are made with beveled cutting edges 18c in their frontal portions, which are open as seen in FIG. 1 to receive a stalk or vine when the implement is applied to cut the same. When the hand-grips 10 are gathered the cutting edges of the blades 18 close on each other in the shearing relation indicated in FIG. 3, and cut the stalk or vine located between them.

The cupped form of the jaws 12 adapts their frontal portions for seating opposed blocks 20 of rubber or similar resilient substance. FIGS. 2 and 4 show that these blocks 20 are intersected by the forward cross-bolts 16, and project toward each other between the jaws 12. Thus, they are the first to engage the stalk or vine—before the blades join in the shearing relation—when the hand-grips 10 are gathered. The stalk or vine is thus held in place by the grip of the rubber blocks 20 as the cutting operation of the implement is completed by the closing of the crossed blades 18. When the vine requires holding from above, as in the case of a bunch of grapes, FIG. 6 shows that the implement is applied with the blades 18 on top, so that the grapes will remain supported from the implement by the grip of the rubber blocks 20 after the vine has been severed. On the other hand, when the desired commodity is a flower at the top of a stem—as shown in FIG. 7—the proper application of the implement is with the cutting blades 18 on the under side, as shown, so that the flower and its stem will remain supported in upstanding position by the implement after the stem has been severed.

It will now be apparent that the improved vine cutter has a number of advantageous features. First, its extended form enables it to be inserted into clusters or groups of plants for cutting application with its front end while the hand holding the implement remains at a safe distance from the vegetation. Further, the implement secures a firm grip on the vine preparatory to cutting the same, saving the use of the other hand to hold the vine and be exposed to crawling insects, stinging by thorns, or other injury. Further, the rubber blocks 20 which engage the vine are seated in sockets formed by the cupped jaws 12, and are positively retained therein by cross-bolts, so as to be replaceable in case of wear or breakage. Further, the hand-grips 10 have a favorable leverage for cutting thick vines or heavy stalks by pivoting the cutting blades 18 from the rear ends of the jaws 12. Further, only the removal of the frontal cross-bolts 16 is required for detaching the blades 18, since the slotted rear ends of the blades make it easy to withdraw them from the rear cross-bolts 15. Finally, the features of the implement are grouped quite compactly, enabling the implement to be produced in a size comparable to a pair of pliers.

Having thus described my invention, what I claim is:

1. A vine cutting implement comprising a pair of hand-grips connected in companion relation by a pivot between them, the hand-grips having extensions forwardly from the pivot, a pair of non-crossed pivoted gripping jaws, pivot pins connecting said extensions and rear ends of said jaws whereby to cause the front ends of the jaws to close when the hand-grips are pressed together, and cutting edge-providing cutter blades closed by the jaws with shearing action in such event, said cutter blades being crossed and having front and rear end portions, pivot means connecting the front cutter blade portions to said front jaw ends, and the rear cutter blade portions pivotally connected to said jaw and hand-grip connecting pivot pins.

2. The structure of claim 1, and means whereby said crossed cutter blades are detachably connected to said pivot means and pivot pins at one side of gripping jaws.

3. The structure of claim 2, and said last named means including a cutout opening from the end of at least one of the front and rear end portions of said cutter blades for receiving one of said pivot means and pivot pins.

4. The structure of claim 1, and at least one compressible member carried by one of said gripping jaws and having a vine-stem-engaging surface which extends outwardly beyond the plane of the related cutting blade edge, and said compressible member being secured to the related gripping jaw by said jaw and blade-connecting pivot means.

5. The structure of claim 1, and opposed compressible members carried by the respective gripping jaws and having vine-stem-engaging surfaces which extend outwardly beyond the plane of the related cutting blade edge, and said compressible members being secured to the related gripping jaw by said jaw and blade-connecting pivot means.

6. The structure of claim 2, and opposed compressible members carried by the respective gripping jaws and having vine-stem-engaging surfaces which extend outwardly beyond the plane of the related cutting blade edge, and said compressible members being secured to the related gripping jaw by said jaw and blade-connecting pivot means.

7. The structure of claim 3, and opposed compressible members carried by the respective gripping jaws and having vine-stem-engaging surfaces which extend outwardly beyond the plane of the related cutting blade edge, and said compressible members being secured to the related gripping jaw by said jaw and blade-connecting pivot means.

8. The structure of claim 3, and at least one compressible member carried by one of said gripping jaws and having a vine-stem-engaging surface which extends outwardly beyond the plane of the related cutting blade edge, and said compressible member being secured to the related gripping jaw by said jaw and blade-connecting pivot means.

References Cited by the Examiner
UNITED STATES PATENTS

| | | | |
|---|---|---|---|
| 936,146 | 10/1909 | Morse | 30—135 |
| 2,287,303 | 6/1942 | Habart et al. | 30—252 |

WILLIAM FELDMAN, *Primary Examiner.*

R. V. PARKER, *Examiner.*